United States Patent
Doberstein et al.

(10) Patent No.: US 7,738,591 B2
(45) Date of Patent: *Jun. 15, 2010

(54) SYSTEM AND METHOD FOR SETTING PHASE REFERENCE POINTS IN CONTINUOUS PHASE MODULATION SYSTEMS BY PROVIDING PILOT SYMBOLS AT A LOCATION OTHER THAN THE LOCATION OF THE PHASE REFERENCE POINT

(75) Inventors: Kevin G. Doberstein, Elmhurst, IL (US); Bradley M. Hiben, Glen Ellyn, IL (US); Lei Xiao, Misawaka, IN (US)

(73) Assignee: Motorola, Inc., Schaumburg, IL (US)

( * ) Notice: Subject to any disclaimer, the term of this patent is extended or adjusted under 35 U.S.C. 154(b) by 670 days.

This patent is subject to a terminal disclaimer.

(21) Appl. No.: 11/620,846

(22) Filed: Jan. 8, 2007

(65) Prior Publication Data
US 2008/0165890 A1 Jul. 10, 2008

(51) Int. Cl.
*H04L 27/04* (2006.01)
(52) U.S. Cl. .................................. 375/295; 375/298
(58) Field of Classification Search ............... 375/295, 375/298, 284, 259, 347; 455/450, 452.2; 370/208, 328
See application file for complete search history.

(56) References Cited

U.S. PATENT DOCUMENTS

| 5,414,734 | A | 5/1995 | Marchetto et al. | |
|---|---|---|---|---|
| 5,712,877 | A | 1/1998 | Ho et al. | |
| 2002/0057661 | A1 | 5/2002 | Raith | |
| 2003/0212851 | A1* | 11/2003 | Drescher et al. | 711/100 |
| 2005/0250450 | A1 | 11/2005 | Olds | |
| 2006/0007949 | A1 | 1/2006 | Okumura | |
| 2006/0007994 | A1* | 1/2006 | Lai et al. | 375/227 |
| 2006/0109938 | A1* | 5/2006 | Challa et al. | 375/347 |
| 2006/0194548 | A1 | 8/2006 | Nagaraj | |
| 2006/0262876 | A1 | 11/2006 | LaDue | |

* cited by examiner

*Primary Examiner*—Khai Tran
(74) *Attorney, Agent, or Firm*—Terri S. Hughes; Valerie M. Davis

(57) ABSTRACT

When a sequence of data bits is to be transmitted, the sequence is precoded into data symbols and organized as data frames. For each data frame, a number of phase reference points at predetermined intervals within the data frame are required to allow a receiving device to sufficiently estimate channel effects on the transmitted data frame. If a data frame has a field where inclusion of pilot symbols is undesirable, and if a phase reference point is required within that field, a set of pilot symbols associated with that phase reference point is generated and inserted into the data frame prior to the beginning of the field. The values for each of the pilot symbols in the set are chosen so as to force the phase reference point to a desired phase state.

20 Claims, 2 Drawing Sheets

SYSTEM AND METHOD FOR SETTING PHASE REFERENCE POINTS IN CONTINUOUS PHASE MODULATION SYSTEMS BY PROVIDING PILOT SYMBOLS AT A LOCATION OTHER THAN THE LOCATION OF THE PHASE REFERENCE POINT

TECHNICAL FIELD OF THE DISCLOSURE

This disclosure relates generally to continuous phase modulation systems, and more particularly, to a system and method for setting phase reference points in continuous phase modulation systems by providing pilot symbols at a location other than the location of the phase reference point.

BACKGROUND OF THE DISCLOSURE

In mobile communication systems, coherent demodulation is often used for data communications between transmitting and receiving devices. Such systems, however, are susceptible to the effects of fading in the communication channel, which causes distortion of the amplitude and carrier phase of the transmitted signal. To compensate for these effects, mobile communication systems using coherent demodulation typically use pilot symbols that are embedded within the transmitted signal. Particularly, the transmitting device inserts the pilot symbols into a data stream at regular intervals to provide known amplitude and phase reference points. The intervals at which the pilot symbols are placed are related to the rate of the fading that is desired to be estimated. The receiving device uses the pilot symbols to estimate the effects of the channel on the carrier phase and/or amplitude of the transmitted signal. Based on these estimated effects, the receiving device is then synchronized to the carrier phase of the transmitted signal.

One example of a coherent demodulation scheme is continuous phase modulation (CPM). In contrast to other coherent digital phase-modulation techniques where the carrier phase at the start of every symbol is not dependent on any previously transmitted symbols, the carrier phase in CPM at the start of each symbol is determined by the cumulative total phase of all previously transmitted symbols, which is known as the phase memory.

A typical method for using pilot symbols to estimate channel effects in a CPM system is taught by Ho et al. in U.S. Pat. No. 7,712,877, and is incorporated herein by reference. In particular, Ho et al. describes a method for generating and inserting data-dependent pilot symbols in a CPM system.

However, there are often instances where the location of a phase reference point falls within a portion of the transmitted signal where insertion of a pilot symbol would be undesirable. For example, in time division multiple access (TDMA) systems, signals are generally structured as data bursts, each of which typically comprises an information field and a synchronization field within the center of the information field. In such TDMA systems, inserting data dependent pilot symbols within the synchronization field is undesirable as doing so prevents the synchronization field from being properly decoded. Simply omitting the pilot symbols is similarly undesirable since doing so reduces the ability of a receiving device to estimate channel effects.

Accordingly, there is a need for a system and method for providing a phase reference point by inserting pilot symbols at a location other than at the location of the phase reference point.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

The present disclosure provides a system and method for setting a phase reference point in a data frame by inserting pilot symbols in a location other than at the location of the phase reference point. When a sequence of data bits is to be transmitted, the sequence is precoded into data symbols and organized as data frames. For each data frame, a number of phase reference points at predetermined intervals within the data frame are required to allow a receiving device to sufficiently estimate channel effects on the transmitted data frame.

If a data frame has a field where inclusion of pilot symbols is undesirable, and if a phase reference point is required within that field, a set of pilot symbols associated with that phase reference point is generated and inserted into the data frame prior to the beginning of the field. The values for each of the pilot symbols in the set are chosen so as to force the phase reference point to a desired phase state.

Figure 1:
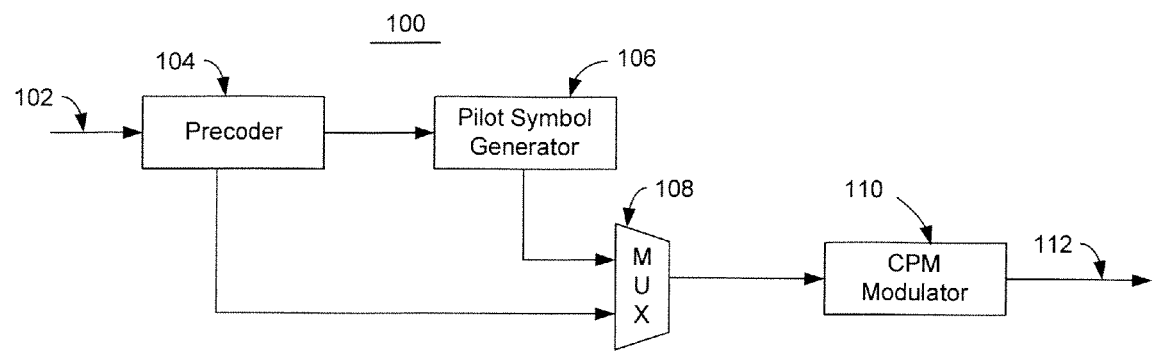
FIG. 1 shows one embodiment of a CPM transmitter in accordance with the present disclosure.
Figure 2:
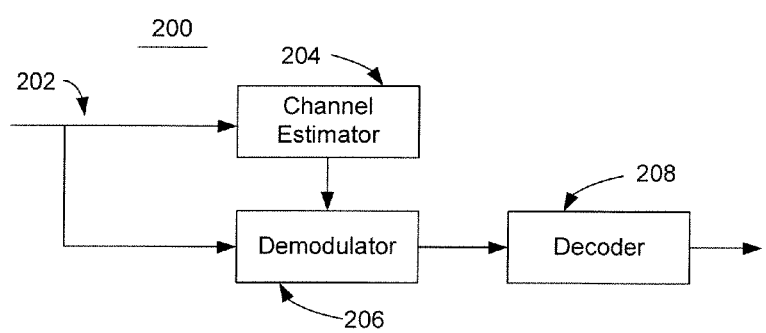
FIG. 2 shows one embodiment of a CPM receiver in accordance with the present disclosure.

Let us now discuss the present disclosure in greater detail by referring to the figures below. FIGS. 1 and 2 illustrate a CPM system in accordance with the present disclosure. More specifically, FIG. 1 illustrates one embodiment of a transmitting device 100 while FIG. 2 illustrates one embodiment of a receiving device 200.

Turning to FIG. 1, the transmitting device 100 includes a precoder 104, a pilot symbol generator 106, a multiplexer 108 and a CPM modulator 110. The precoder 104 is configured to receive a sequence of input data 102. The precoder 104 maps the data bits of the received sequence into data symbols, and organizes the data symbols into frames. As would be understood by one skilled in the art, each of the data symbols is indicative of a phase change from one phase state to another, where the phase state is taken as modulo $2\pi$ and the specific available phase states are determined by the modulation index. For example, if the modulation index is ½, the possible phase states are 0, π/2, π, and 3π/2. In this example, each data symbol may then be indicative of a phase shift of +π/2, −π/2, +3π/2 or −3π/2.

Once the data bits for a given data frame have been encoded into data symbols, the data frame is provided to the pilot symbol generator 106. Based on the received data symbols for the data frame, the pilot symbol generator 106 generates one or more sets of pilot symbols that are then added to the data frame using multiplexer 108 (either by inserting the pilot symbols between existing data symbols or by replacing existing data symbols with the pilot symbols). Similar to data symbols, each pilot symbol is indicative of a phase shift from one phase state to another, although values for pilot symbols need not be selected from the same set of values as those of the data symbols. Each set of pilot symbols is chosen so as to create specific phase states at multiple phase reference points within the data frame that are known to the receiving device. The specific process for generating and inserting pilot words in accordance with the present disclosure will be discussed later.

The multiplexed signal is output from the multiplexer 108 to the CPM modulator 110, which performs the appropriate modulation scheme. The modulated signal 112 is then output from the CPM modulator 110 and sent over a communication channel which, for example, may have characteristics described by a Rayleigh fading model.

As would be understood by one skilled in the art, the transmitted signal may be modulated using either a "full response" modulation scheme or a "partial response" modulation scheme. In "full response" continuous phase modulation schemes, the phase transition of a given symbol completes fully within a symbol period, therefore, the phase state of each symbol in the data frame is determined by the sum of all the previous data symbols in the frame. Thus, for "full response" modulation schemes, the phase state for a particular data symbol may be defined as:

$$\Phi(n) = \theta_0 + \sum_{k=0}^{n} S(k) \quad (1)$$

where $\Phi(n)$ is the phase at the $n^{th}$ symbol, $\theta_0$ is the initial phase for the data frame, and $S(k)$ is the phase change for the $k^{th}$ symbol.

On the other hand, in a "partial response" continuous phase modulation schemes, the phase transition of a given symbol requires two or more full symbol periods. In way of example, for "partial response" modulation schemes that require two symbol periods to complete the phase shift for a given symbol, the phase state for a particular data symbol may be defined as follows:

$$\Phi(n) = \theta_0 + \sum_{k=0}^{n-1} S(k) + \frac{1}{2} S(n) \quad (4)$$

where $\Phi(n)$ is the phase at the $n^{th}$ symbol, $\theta_0$ is the initial phase for the data frame, $S(k)$ is the phase change for the $k^{th}$ symbol, and $S(n)$ is the phase change for the $n^{th}$ symbol.

Turning to FIG. 2, the receiving device 200 includes a channel estimator 204, a demodulator 206, and a decoder 208. Upon receiving the transmitted signal 202, the channel estimator 204 estimates the effects of channel fading based on the expected phase state at the known phase reference points. The information regarding the effects of the channel is sent to the demodulator 206. This information is then exploited by the demodulator 206 during demodulation to compensate for any channel effects on the received data symbols (in phase and amplitude) on a symbol-by-symbol basis. The output from the demodulator is sent to the decoder 208, which undoes the mapping done by the precoder 104.

Figure 3:
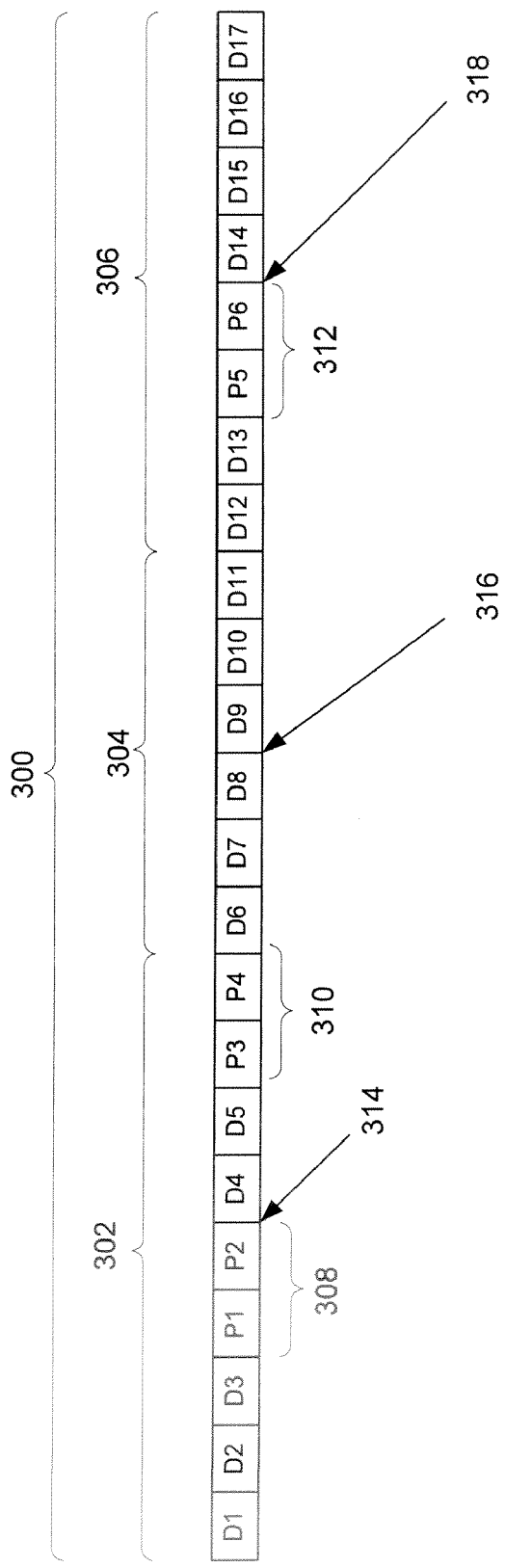
FIG. 3 shows a diagram of one embodiment of a method for inserting pilot symbols into a data frame in accordance with the present disclosure.

FIG. 3 illustrates a method for generating and inserting pilot symbols within a data frame 300 in accordance with the present disclosure. The data frame 300 is comprised of a series of data symbols and pilot symbols, where data symbols are identified using the prefix "D" and pilot symbols are identified using the prefix "P." The data frame 300 also includes a first field 302, a second field 304, and a third field 306.

In this example, the second field 304 is of a format where insertion of a pilot symbol within the second field 304 would prevent the information in the field from being properly processed by the receiving device 200. On the other hand, the first and third fields 302 and 306 can include pilot symbols without any significant impact on the ability of the receiving device to process information in those fields. For instance, in one embodiment, the data frame 300 may be a TDMA burst, where both the first field 302 and the third field 306 correspond to portions of an Information field and the second field 304 corresponds to a synchronization field centered within the data frame between the first and third fields. The synchronization field generally includes a synchronization word that is detected by the receiving device as a whole. Therefore, insertion of pilot symbols within the synchronization field would prevent the receiving device from properly detecting and processing the synchronization word.

As shown in FIG. 3, the illustrated data frame 300 also requires three phase reference points 314, 316, and 318 with the first reference point 324 being in the first field 302, the second reference point 316 being in the second field 304, and the third reference point 318 being in the third field 306. To set each of the first, second, and third reference points to a desired phase state, three sets of pilot symbols 308, 310, and 312 are used.

Phase reference points 314 and 318 in the first and third fields 302 and 306 are set using convention pilot insertion techniques. That is, a first set of pilot symbols 308, comprised of P1 and P2, are inserted into the data frame 300 immediately prior to the first phase reference point 314, and the values for P1 and P2 are calculated to force the first phase reference point 314 to a desired phase state. Similarly, another set of pilot symbols 312, comprised of P5 and P6, are inserted into the data frame 300 immediately prior to the third phase reference point 318, and the values for P5 and P6 are calculated to force the third phase reference point 318 to a desired phase state. The desired phase state for the third phase reference point 318 may or may not be the same as the desired phase state for the first phase reference point 314.

In accordance with the present disclosure, the second phase reference point 316 in the second field 304 is set by inserting a set of pilot symbols 310 prior to the second field 304 and subsequent to the first phase reference point 314. For example, in the embodiment shown in FIG. 3, the second set of pilot symbols 310 is inserted immediately prior to the beginning of the second field 304 (i.e., immediately before data symbol D6). However, it should be understood that the second set of pilot symbols 310 may also be inserted at another location between the beginning of the second field 304 and the first phase reference point 314 (i.e., immediately prior to data symbols D4 or D5). The values for the second set of pilot symbols 310, which is comprised of P3 and P4, are chosen so as to force the phase at the second phase reference point 316 (which is after data symbol D8) to a desired phase state, which again may be the same or different than the desired phase state for the first and third reference points.

To determine the specific values for each of the pilot symbols P1-P6, several calculations may be performed. Taking first the case of "full response" signaling, the values of P1 and P2 are determined based on all the prior data symbols in the data frame. More specifically, assuming that the start phase of the data frame is zero, the values for pilot symbols P1 and P2 are chosen to satisfy the following equation:

$$\text{MOD}(D1+D2+D3+P1+P2, 2\pi) = \text{desired\_phase\_state\_PRP1} \quad (3)$$

where D1, D2, D3, P1, and P2 are the phase changes for their respective symbols, the sum of which is taken modulo $2\pi$, and desired_phase_state_PRP1 is the desired phase state at the first phase reference point 314.

In accordance with the present disclosure, pilot symbols P3 and P4 are then set based not only on the values of prior symbols, but also on subsequent symbols leading up to the second phase reference point 316. Thus, P3 and P4 are chosen to satisfy the following equation:

$$\text{MOD}(\text{desired\_phase\_state\_PRP1}+D4+D5+P3+P4+D6+D7+D8, 2\pi) = \text{desired\_phase\_state\_PRP2} \quad (4)$$

where desired_phase_state_PRP2 is the desired phase state at the second phase reference point 316.

Pilot symbols P5 and P6 are then calculated in a similar manner as pilot symbols P1 and P2. Particularly, the values of P5 and P6 are based on the phase states of prior symbols in the data frame 300 and are chosen so as to satisfy the following equation:

$$\text{MOD}(\text{desired\_phase\_state\_PRP2}+D9+D10+D11+D12+D13+P5+P6, 2\pi) = \text{desired\_phase\_state\_PRP3} \quad (5)$$

where desired_phase_state_PRP3 is the desired phase state at the third phase reference point 318.

For the case of "partial response" signaling, the calculations are altered to compensate for the fact that the phase transition of a given symbol requires potentially more than one symbol period, in this example, the phase transition requires two full symbol periods although the concept is easily extendable to other lengths by those skilled in the art. Accordingly, for this class of "partial response" modulation schemes, the values for each set of pilot symbols 308, 310 and 312 in FIG. 3 are chosen to satisfy the following equations (again assuming a start phase of zero for the data frame):

$$\text{MOD}(D1+D2+D3+P1+\tfrac{1}{2}*P2, 2\pi) = \text{desired\_phase\_state\_PRP1} \quad (6)$$

$$\text{MOD}(\text{desired\_phase\_state\_PRP1}+\tfrac{1}{2}*P2+D4+D5+P3+P4+D6+D7+\tfrac{1}{2}*D8, 2\pi) = \text{desired\_phase\_state\_PRP2} \quad (7)$$

$$\text{MOD}(\text{desired\_phase\_state\_PRP2}+\tfrac{1}{2}*D8+D9+D10+D11+D12+D13+P5+\tfrac{1}{2}*P6, 2\pi) = \text{desired\_phase\_state\_PRP3} \quad (8)$$

By means of the aforementioned disclosure, a set of pilot symbols (i.e., pilot symbols P3 and P4 in FIG. 3) placed at one location in a data frame can be used to set a phase reference point at a later location in the data frame. As a result, phase reference points can be provided in portions or fields of a data frame in which insertion of pilot symbols is not desired.

Further advantages and modifications of the above described system and method will readily occur to those skilled in the art. For example, while one exemplary embodiment of a data frame 300 is illustrated in FIG. 3, it is understood that a data frame may include any number of fields, each containing any number of data symbols, and more than one field in the data frame may be of a format in which insertion of pilot symbols is undesirable. The data frame 300 may also require only two phase reference points or more than three reference points. It should also be understood that the present disclosure may also be used for setting a phase reference point using a set of pilot symbols inserted at an earlier location of the data frame, even if the earlier location is within the same field. This may be advantageous if it is desirable that only a portion of a field not have pilot symbols, rather than an entire field.

Additionally, while each set of pilot symbols 308, 310, and 312 is illustrated in FIG. 3 as being comprised of two pilot symbols, it is well-known in the art that the number of pilot symbols used to set each phase reference point may be altered depending on the configuration of the system and the modulation index being used. For example, each set of pilot symbols may be comprised of only one pilot symbol, or more than two pilot symbols, so long as the associated phase reference point can be set to any one of the available phase states for that phase reference point. Each of the pilot symbols within a set also need not be positioned directly next to one another. For example, in the embodiment illustrated in FIG. 3, pilot symbol P3 may be inserted after data symbol D4 while pilot symbol P4 is inserted after data symbol D5.

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for transmitting digital information using a continuous phase modulation scheme, the method comprising:

obtaining a data frame having a plurality of fields and requiring a number of phase reference points to allow a receiving device to sufficiently estimate effects of a channel on the data frame during transmission, wherein a first phase reference point is located within a field in which insertion of a pilot symbol is undesirable;

generating a set of pilot symbols associated with the first phase reference point, the set of pilot symbols comprising at least one pilot symbol; and inserting the set of pilot symbols prior to the field in which the first phase reference point is located, wherein the value of each pilot symbol in the set of pilot symbols is calculated so as to force the first phase reference point to be at a desired phase state.

2. The method of claim 1 wherein the data frame further includes a second phase reference point preceding the first phase reference point, and inserting the set of pilot symbols includes inserting the set of pilot symbols prior to the field in which the first phase reference point is located but subsequent to the second phase reference point.

3. The method of claim 1 wherein the set of pilot symbols includes two pilot symbols.

4. The method of claim 1 further including modulating the data frame using a full response modulation scheme.

5. The method of claim 1 further including modulating the data frame using a partial response modulation scheme.

6. The method of claim 1 wherein the data frame is a time division multiple access (TDMA) burst, and the field is a synchronization field.

7. A method for transmitting digital information using a continuous mode modulation scheme, the method comprising:
   obtaining a data frame comprised of a plurality of data symbols and requiring a number of phase reference points to allow a receiving device to sufficiently estimate effects of the channel on the data frame during transmission;
   generating a set of pilot symbols associated with one of the phase reference points, the set of pilot symbols comprising at least one pilot symbol; and
   inserting the set of pilot symbols at a location that is x number of data symbols prior to the phase reference point associated with the set of pilot symbols,
   wherein the value of each pilot symbol in the set of pilot symbols is calculated so as to force the phase reference point associated with the set of pilot symbols to be at a desired phase state.

8. The method of claim 7 wherein x is greater than 1.

9. The system of claim 1 wherein the data frame includes a plurality of fields, wherein one of the number of phase reference points is located within a field in which insertion of pilot symbols is not desired, and wherein at least one set of pilot symbols is placed at a location within the data frame prior to the field in which insertion of pilot symbols is not desired.

10. The method of claim 8 wherein x is less than a number of data symbols between adjacent phase reference points in the data frame.

11. The method of claim 7 wherein the set of pilot symbols includes two pilot symbols.

12. The method of claim 7 further including modulating the data frame using a full response modulation scheme.

13. The method of claim 7 further including modulating the data frame using a partial response modulation scheme.

14. The method of claim 7 wherein the data frame is a time division multiple access (TDMA) burst, and the phase reference point is located within a synchronization field.

15. The method of claim 14 wherein the set of pilot symbols is inserted prior to the synchronization field.

16. A system for communicating digital information using a continuous phase modulation scheme comprising:
   a precoder for receiving a sequence of data bits, mapping the sequence of data bits into data symbols and organizing the data symbols into one or more data frames;
   a pilot symbol generator for generating and inserting sets of pilot symbols into each data frame such that each data frame includes a predetermined number of phase reference points; and
   a continuous phase modulator for modulating and transmitting each data frame over a communication channel,
   wherein at least one of the sets of pilot symbols inserted into the data frame is located at least one data symbol earlier than a phase reference point with which it is associated.

17. The system of claim 16 each pilot symbol set includes at least one pilot symbol.

18. The system of claim 16 wherein the pilot symbol generator inserts pilot symbols into each data frame via a multiplexer.

19. The system of claim 16 wherein the continuous phase modulator performs either a full response modulation scheme or a partial response modulation scheme.

20. The system of claim 16 further including:
   a channel estimator for estimating channel phase distortion for a data frame received on the communication channel based on the phase state of each of the number of phase reference points in the data frame; and
   a demodulator for demodulating the data frame based on the estimated channel phase distortion.

* * * * *

UNITED STATES PATENT AND TRADEMARK OFFICE
CERTIFICATE OF CORRECTION

| | |
|---|---|
| PATENT NO. | : 7,738,591 B2 |
| APPLICATION NO. | : 11/620846 |
| DATED | : June 15, 2010 |
| INVENTOR(S) | : Doberstein et al. |

It is certified that error appears in the above-identified patent and that said Letters Patent is hereby corrected as shown below:

Title Page, Item (75), under "Inventors", in Column 1, Line 3, delete "Misawaka," and insert -- Mishawaka, --, therefor.

In Column 5, Lines 13-14, in Equation (3), delete "state₁₃PRP1" and insert -- state_PRP1 --, therefor.

In Column 5, Lines 26-28, in Equation (4),
MOD(desired_phase_state_PRP1+D4+D5+P3+P4+
D6+ delete " $D7+D8,2\pi$)=desired_phase_state_PRP2 " and insert -- MOD(desired_phase_state_PRP1+D4+D5+P3+P4+
$D6+D7+D8,2\pi$)=desired_phase_state_PRP2 --, therefor.

In Column 5, Lines 37-40, in Equation (5),
MOD(desired_phase_state_PRP2+D9+D10+D11+
D12+ delete " $D13+P5+P6,2\pi$)=desired_phase_state_PRP3 " and insert -- MOD(desired_phase_state_PRP2+D9+D10+D11+
$D12+D13+P5+P6,2\pi$)=desired_phase_state_PRP3 --, therefor.

In Column 5, Lines 58-60, in Equation (7),
MOD(desired_phase_state_PRP1+½*P2+D4+D5+
P3+P4+D6+ delete " $D7+½*D8,2\pi$)=desired_phase_state_PRP2 " and

Signed and Sealed this
Fourteenth Day of August, 2012

David J. Kappos
*Director of the United States Patent and Trademark Office*

CERTIFICATE OF CORRECTION (continued)
U.S. Pat. No. 7,738,591 B2 insert -- $$MOD(desired\_phase\_state\_PRP1+½*P2+D4+D5+P3+P4+D6+D7+½*D8,2\pi)=desired\_phase\_state\_PRP2$$ --, therefor.

In Column 5, Lines 62-65, in Equation (8),
$$MOD(desired\_phase\_state\_PRP2+½*D8+D9+D10+D11+D12+$$

delete " $D13+P5+½*P6,2\pi)=desired\_phase\_state\_PRP3$ " and insert -- $$MOD(desired\_phase\_state\_PRP2+½*D8+D9+D10+D11+D12+D13+P5+½*P6,2\pi)=desired\_phase\_state\_PRP3$$ --, therefor.

In Column 8, Line 25, in Claim 17, delete "each" and insert -- wherein each --, therefor.